United States Patent [19]

Marshall

[11] Patent Number: 4,900,895
[45] Date of Patent: Feb. 13, 1990

[54] RECTANGULAR ELECTRODE

[75] Inventor: Claire B. Marshall, York, Pa.

[73] Assignee: Alloy Rods Global, Inc., Hanover, Pa.

[21] Appl. No.: 309,015

[22] Filed: Feb. 8, 1989

Related U.S. Application Data

[63] Continuation of Ser. No. 724,041, Apr. 18, 1985, abandoned, which is a continuation of Ser. No. 148,603, May 9, 1980, abandoned.

[51] Int. Cl.$^4$ .............................................. B23K 35/00
[52] U.S. Cl. ............................................... 219/145.22
[58] Field of Search ......................... 219/145.1, 145.22; 29/592 R

[56] References Cited

U.S. PATENT DOCUMENTS

| 628,541 | 7/1899 | Kester | 219/145.22 X |
|---|---|---|---|
| 1,690,534 | 11/1928 | Erich | 219/145.22 X |
| 2,350,387 | 6/1944 | Cito | 219/145.1 X |
| 3,474,518 | 10/1969 | Strandell | 219/145.22 X |
| 4,137,446 | 1/1979 | Blanpain | 219/145.22 |
| 4,203,188 | 5/1980 | Blainpain et al. | 219/145.22 X |

FOREIGN PATENT DOCUMENTS

| 277055 | 12/1965 | Australia | 219/145.22 |
|---|---|---|---|
| 278476 | 8/1967 | Australia | 219/145.1 |
| 657027 | 1/1965 | Belgium | 219/145.22 |
| 31562 | 9/1964 | German Democratic Rep. | 219/145.22 |
| 602558 | 4/1958 | Japan . | |
| 4461876 | 9/1976 | Japan . | |
| 618429 | 2/1949 | United Kingdom | 219/145.1 |

Primary Examiner—Clifford C. Shaw
Attorney, Agent, or Firm—Parmelee, Miller, Welsh & Kratz

[57] ABSTRACT

An improved method of making a generally rectangular continuous electrode having a width to thickness ratio of at least 4:1 is disclosed comprising the steps of forming sheet metal into a first continuous trough shaped sheath, filling the trough with granular core materials and enclosing the trough. The core materials are restricted within the electrode by intermittently mechanically depressing a portion of at least one electrode wall which defines the width of the electrode, inwardly of the electrode.

31 Claims, 3 Drawing Sheets

RECTANGULAR ELECTRODE

This is a continuation of co-pending application Ser. No. 724,041 filed Apr. 18, 1985, now abandoned, which is a continuation of Ser. No. 148,603 filed May 9, 1980, now abandoned.

BACKGROUND OF THE INVENTION

The present invention pertains to electrodes, wires, or rods which are typically used for welding, soldering, brazing or hard-facing applications. Such electrodes typically contain filler materials therein along the length thereof. The filler ingredients in the core of such electrodes may include base metals, alloys, flux forming ingredients, deoxidizers, arc stabilizers and the like typically in particulate, powder or granular form.

A typical flux cored electrode of the prior art is disclosed in U.S. Pat. No. 3,051,822. As taught therein such electrode is constructed of strip steel formed into tubular shape. The tube is formed of the metal to be consumed and transferred to a weld. The electrode further includes a core of alloy and flux forming ingredients. After the tubular electrode is closed around the core, the tube may be successively drawn or rolled to smaller diameters. Such cold reduction of the cross section of the tube compacts the core materials, in place, and eliminates void spaces throughout the length of the electrode.

Compaction of core materials inside an electrode is necessary to insure that the filler materials are distributed uniformly and held in position to prevent such materials from flowing from the core of the electrode during welding, soldering, brazing and hard-facing.

The prior art teaches various alternative methods of holding electrode core materials in place, including the following. U.S. Pat. No. 1,650,905 teaches the preferred use of a carbonaceous binder to hold filler materials in a generally rectangular, open, trough-shaped welding rod. Also U.S. Pat. No. 1,891,546 teaches double sheathing of core materials to prevent the opening of a soldering or brazing rod during handling. U.S. Pat. No. 4,137,446, which also pertains to the use of an inner metallic sheath to isolate the filler materials from the weld joint of an outer sheath, shows a welding wire having a rectangular configuration.

This invention pertains to a generally rectangular, two piece electrode housing granular core materials therein. The prior art methods of holding the granular electrode filler materials in position, as discussed above, are not considered adequate for the electrode of the present invention. Accordingly, a new and improved electrode, and method of making such electrode are desired which insures that granular electrode core materials are held in position within a two piece generally rectangular electrode.

The present invention may be summarized as providing an improved method of making a generally rectangular continuous electrode having a width to thickness ratio of at least 4:1 comprising the steps of forming sheet metal into a first continuous trough shaped sheath, filling the trough with granular core materials and enclosing the trough. The core materials are restricted within the electrode by intermittently mechanically depressing a portion of at least one electrode wall inwardly of the electrode.

An objective of the present invention is to provide a new and improved method of restricting electrode core materials within a two piece, generally rectangular electrode, particularly electrodes having a large width to thickness ratio, wherein conventional drawing or rolling is unable to prevent shifting of the filler materials in the core.

The above and other objectives and advantages of this invention will be more fully understood and appreciated with reference to the following description and the drawings.

DETAILED DESCRIPTION

The electrodes which are the subject of the present invention are those used in welding, soldering, brazing and hard-facing applications. It is conventional to construct such electrodes of a sheet metal housing or sheath disposed around and enclosing granular core materials in the central portion of the electrode. Common electrodes are generally of tubular construction, typically having a diameter on the order of about 1/16 to ¼ inch. The present invention, on the other hand, is directed to a generally rectangular electrode having a width to thickness ratio of at least 4:1 and, most preferably, of at least 6:1. Such generally rectangular electrodes are particularly useful in applications such as overlay welding and cladding of a base metal with higher alloy materials for the purpose of enhancing wear resistance, corrosion resistance and the like. It should be understood that the term generally rectangular is to be given broad interpretation, and in particular, is meant to include ovular structures, as well as structures which do not have substantially planar walls, wherein the maximum width to maximum thickness ratio is at least 4:1.

Figure 1:
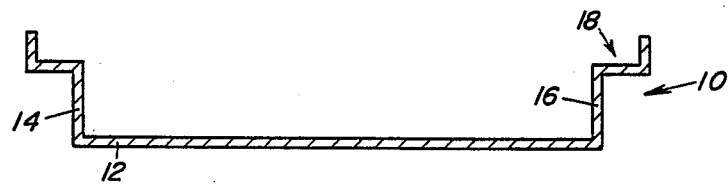
FIGS. 1-5 show, sequentially, and in cross section, various stages of a process for forming a two piece generally rectangular core filled electrode of the present invention.
Figure 2:
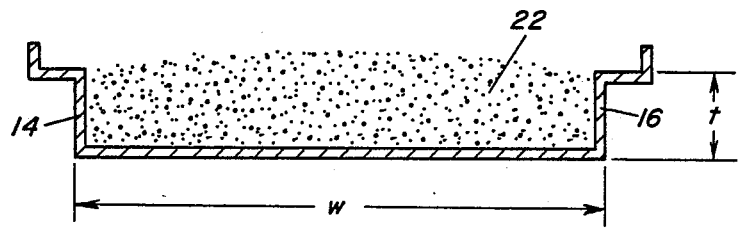
Figure 3:
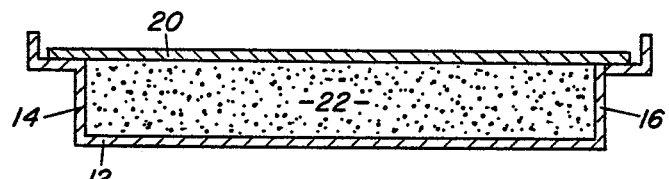

Referring particularly to the drawings, FIGS. 1-5 illustrate sequentially, in cross-section, exemplary steps involved in making an electrode of the present invention. In the drawings, width is designated by the letter "w" and thickness is designated by the letter "t". As shown in FIG. 1, a first step in forming an electrode of the present invention may involve forming a strip of sheet metal into a rectangular, trough-shaped sheath 10 having a bottom wall 12 and sidewalls 14 and 16. As shown in FIGS. 1-3, the end portions of the sidewalls 14 and 16 may be formed into a ledge or step 18 for receiving a closure 20 for the electrode as explained in detail below. Forming sheet metal in accordance with the present invention is considered, in and of itself, known technology. Therefore, the tools and dies which may be utilized to form the sheet metal of the present invention are not illustrated herein.

The electrode of the present invention may be provided with a sheath of any metal which lends itself to the desired configuration as explained below. Typically, the sheath 10 is made of mild steel, stainless steel, copper, aluminum, nickel, cobalt or alloys thereof.

It should be apparent that the formation of the electrode of the present invention is a continuous operation. It is conventional that a coil of strip material would be continuously fed through appropriate tools and dies to form a trough-shaped sheath 10 such as that illustrated in FIG. 1. After the strip is formed into the trough-shaped sheath, the sheath is fed through appropriate feeding mechanisms which fill the trough with appropriate filler materials, or core materials 22.

The core materials 22 are granular in form, including particulate and powder materials. Typical core ingredients for electrodes include slag forming ingredients, deoxidizers and various alloying ingredients. Additionally, weld metal powder such as iron powder may be added to the core of an electrode of the present invention. A typical core composition of an electrode of the present invention for an austenitic stainless steel weld deposit may consist of a mixture of the following ingredients:

| Ingredient | Percent |
| --- | --- |
| Ferrochrome | 61.50 |
| Nickel | 25.50 |
| Manganese | 2.00 |
| Ferrosilicon | 2.00 |
| Iron Powder | 9.00 |
| Total | 100.00 |

It is conventional to feed electrode core materials from a hopper through a metering feeder and onto a moving conveyor which feeds a trough-shaped sheath. By such conventional feeding equipment, the feed rate, in terms of volume, can be stringently controlled. It is also conventional to employ a scraper or doctor blade above the trough to remove any excess core materials from the trough prior to closing the core. In order to minimize void spaces in the core and to assist in compaction of the core, the doctor blade may be arranged to permit slight overfill of the core materials 22 into the trough-shaped sheath 10 as illustrated in FIG. 2.

Figure 4:
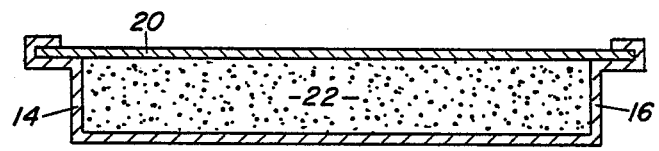
Figure 5:
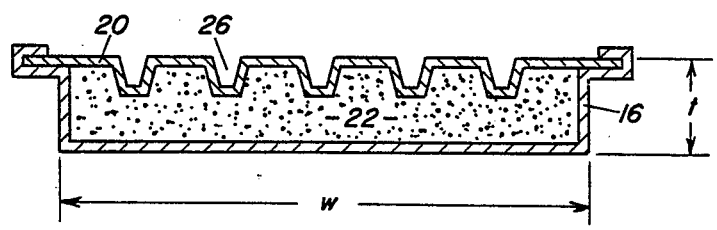

After the sheath 10 is filled with core materials 22, a separate cover, lid or closure 20 may be placed over the sheath 10. A typical closure 20 comprises a generally planar strip of sheet metal which is continuously disposed over the filled trough 10. It should be understood that the type of metal employed for the closure 20 may or may not be the same as that employed for the trough 10. The core materials should be completely enclosed within the electrode. As shown in FIG. 4, the edges of the strip 20 are then mechanically bound with the edges of the sheath 10. This is typically accomplished by crimping or seaming the respective edges with one another.

Figure 10:
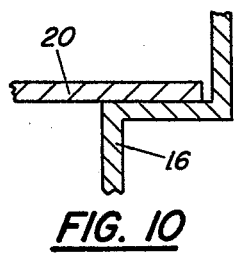
FIGS. 10-12 and FIGS. 13-15 show alternative seaming arrangements of the present invention in enlarged cross-section.
Figure 11:
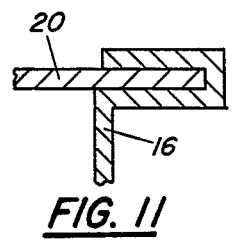
Figure 12:
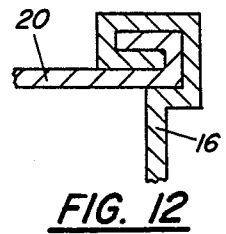
Figure 13:
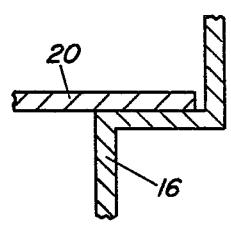
Figure 14:
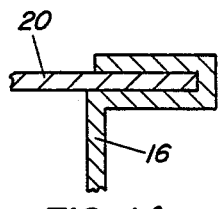
Figure 15:
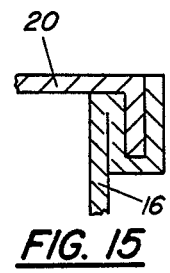

A single seam, or crimp may be provided as shown in FIG. 4 by folding the end portions of the sheath walls 14 and 16 over the edged portions of the strip 20. Alternatively, as shown in FIGS. 10, 11 and 12 and in FIGS. 13, 14 and 15 a double seam or side seam may be provided. Thus, as these figures indicate, the width of the closure 20 may define the approximate width of the electrode. Alternatively, FIG. 16 indicates another embodiment of the electrode wherein the width of the closure 20 may define the approximate thickness of the electrode. Also, the bulk of the finished seam may be disposed above the closure 20 as shown in FIG. 12, or, adjacent the side walls 14 and 16 as shown in FIG. 15. It should be understood that the various crimps or seams shown in the drawings may be further compressed with the appropriate equipment such as by passing the seam through a pair of flattening rolls. What is required of the crimp or seam of the present invention is that the closure 20 remain attached to the sheath 10 during subsequent forming operations and during handling, winding and operation of the electrode of the present invention. It should be further understood that the seamed area of the electrode of the present invention may be strengthened by spot welding or the like.

As explained above, the sheath 10 may be slightly overfilled, as shown in FIG. 2, to accommodate a certain degree of compaction of filler materials 22 as the closure 20 is attached thereto. Despite such preliminary compaction of the filler materials, further compartmentalization must be effected to assure that the core materials 22 remain in-place during the handling, coiling and operation of the electrode of the present invention. In accordance with the present invention, a portion of at least one electrode wall is intermittently, mechanically depressed inwardly toward the core 22 to restrict the electrode core materials 22 into compartments within the electrode.

Intermittent, mechanical depression of a portion of at least one wall of the electrode may be accomplished by a variety of methods. For example, a series of score lines may be provided in one or both electrode walls defining the width of the electrode. Such score lines may have the effect of thinning the metal wall in certain of the depressed areas, but should not cut through the metal wall.

The preferred method of restricting the electrode materials 22 is by knurling at least one wall of the electrode. Any knurling pattern which accomplishes the required restriction and, perhaps, densification of the core materials 22 may be employed, the most common being a diamond pattern. Knurling efficiently creates a number of core compression pockets or cavities 24 within the electrode each defined within each indentation pattern, or knurl pattern 26. As a result of knurling, the core materials 22 formerly located at the points of the knurl pattern 26 may be forced into a compression cavity, or pocket 24, in such a manner that the free flow of the core materials 22 is restricted.

As discussed above, the preferred process of mechanically depressing a rectangular electrode of the present invention is by knurling which compresses the granular core materials 22 into compartments such that free flow is restricted. This means that because of such compartmentalization the core materials 22 cannot flow freely from the tubular electrode without some form of external impact or agitation. The knurl pattern may be of any configuration, such as diamond, square or parallel, but must be able to restrict the flow of core materials 22.

The spacing of the knurl patterns may depend upon the thickness of the originally seamed electrode, the gauge of the metal sheath 10 and closure 20, the type of metal employed and the particle size of the granular core materials 22 inside the electrode. Typical spacings between knurl patterns can be expected to be less than about one-half inch, although larger patterns may be comprehended in certain conditions. It is also expected that the knurl patterns would be spaced at least about one-sixteenth inch from one another. It has been found that a mechanical depression must be provided within a spacing of about 25% of the width of the electrode in order for the core materials to be adequately restricted. In other words, the size of any undepressed area, at least on one side of the electrode which is provided with mechanical depressions, must have at least one dimension which does not exceed 25% of the maximum width of the electrode.

Figure 8:
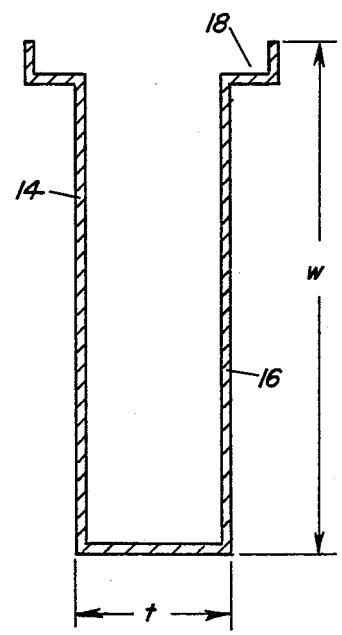
FIG. 8 is a cross-sectional view of a trough-shaped sheath of the present invention as an alternative to the trough-shaped sheath shown in FIG. 1.
Figure 16:
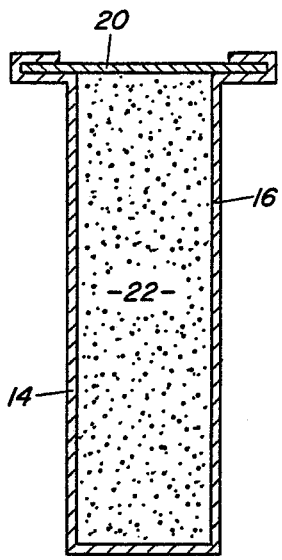
FIG. 16 is a cross sectional view of an alternative seaming arrangement for an electrode formed from the trough-shaped sheath illustrated in FIG. 8, prior to restriction of the core materials.
Figure 17:
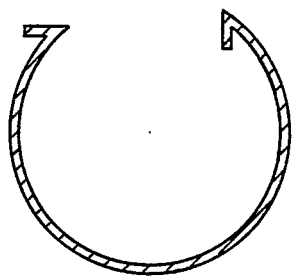
FIGS. 17-20 show sequentially, and in cross-section, various stages of a process for forming a one-piece generally circular trough into a generally rectangular electrode in accordance with the present invention.
Figure 18:
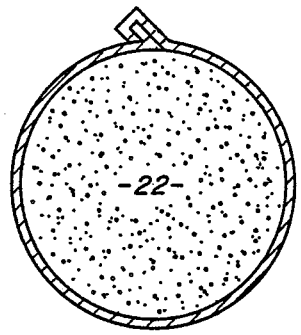

During knurling, precautions may be taken to hold the seam, or crimp, from dislodging or otherwise coming loose. In certain instances it may be necessary or helpful to weld the joint after seaming or crimping. It has been found that in some applications seam disassembly may be avoided by knurling the bottom wall 12 which is located more remotely from the seam than the cover 20. Alternatively, either or both sidewalls 14 and 16 of an electrode as shown in FIGS. 8 and 16 may be knurled with little or no effect on the seam. However, it should be understood that the present invention applies to the knurling, or other mechanical depression of either electrode wall, or both electrode walls, defining the larger width dimension "w" of the electrode of the present invention over the continuous length of the electrode. Those skilled in the art should appreciate that the entire length of an electrode may be provided with mechanical depressions by intermittently alternating the side that is depressed or knurled. Consideration may have to be given to the particular knurl pattern employed to restrict the core materials. For example if the rectangular electrode of the present invention is to be coiled, a knurl pattern which compliments coiling should be used. A rectangular knurl pattern disposed with its rectangle length parallel with the longitudinal axis of the electrode may create stress patterns in the sheet metal which resist coiling. Alternatively, rectangular knurl patterns disposed with the rectangle length perpendicular to the longitudinal axis of the electrode may contribute to the efficient coiling of the electrode.

Figure 6:
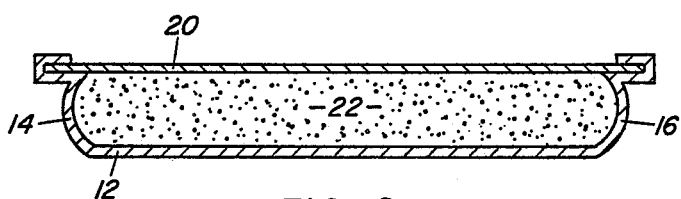
FIG. 6 is a cross-sectional view of an alternative electrode of the present invention prior to restriction of the core materials.
Figure 7:
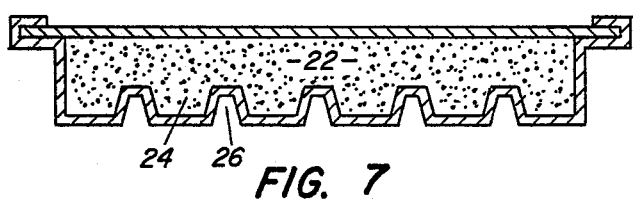
FIG. 7 is a cross-sectional view of the electrode shown in FIG. 6 after restriction of the core materials.
Figure 9:
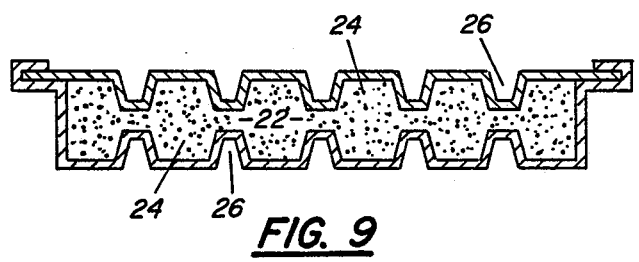
FIG. 9 is a cross-sectional view of an alternative electrode of the present invention.

A further result of knurling can be bulging of the sidewalls 14 and 16 of the electrode as illustrated in FIG. 6. However, if desired such sidewalls 14 and 16 may be given side support during knurling to prevent bulging during knurling and to produce an electrode such as that shown in FIG. 9 with generally planar sidewall and a thickness approximating the combined depth of the depressions in the sheath and the strip.

In certain instances it may be beneficial to sinter the core materials 22 or to utilize binders in the core. Such methods would contribute to the restriction of the free flow of the granular materials from the generally rectangular electrode of the present invention. Additionally, resistance welding, spot welding, multiple seam welding, electron beam welding and laser welding may be utilized to assist in holding the granular filler materials 22 and the seam in position in the electrode.

Figure 19:
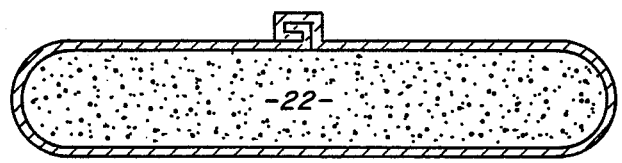
Figure 20:
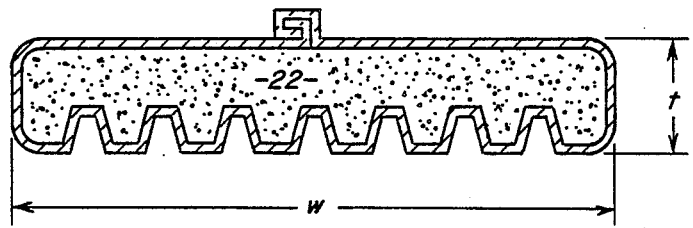

In an alternative embodiment, as illustrated in FIGS. 17–20, a generally circular trough is filled with core materials 22. Then the edge portions are bound, such as by the interlocking seam or crimp arrangement shown in FIG. 18. After seaming, the electrode may be flattened into a generally rectangular structure having a width to thickness ratio of at least about 4:1, as shown in FIG. 19. Thereafter, at least one side of the rectangular electrode is mechanically depressed to restrict the core materials 22, in place, in the electrode. It should be understood that the flattening and the knurling operation may be performed simultaneously by the present invention. Also, the flattening operation may have the beneficial effect of tightening the electrode seam.

Rectangular electrodes are generally used for the same purposes as conventional tubular electrodes. However, it has been found that electrodes of rectangular construction may deposit a greater amount of weld metal over a wide area at one time with a minimum of dilution of the base metal into the weld metal. A rectangular electrode has the advantage of spreading a great amount of power over a greater area. With conventional tubular electrodes this can only be accomplished by manually or automatically oscillating the electrode. The possibility of a defect in the weld metal is thus reduced with the rectangular electrode of the present invention as compared to oscillating applications with tubular electrodes.

Typical rectangular electrodes of the present invention would have the following characteristics:

| | | Example 1 | Example 2 |
|---|---|---|---|
| Sheath: | AISI alloy: | 1002 | 1008 |
| | dimension (inch) | | |
| | trough: | .011 × 1.671 | .011 × 1.671 |
| | cover: | .011 × 1.340 | .011 × 1.340 |
| Core: | Composition (Percent) | | |
| | FeCr (73.8% Cr) | 61.50 | — |
| | FeMn (77% Mn; 6.6% C) | — | 3.50 |
| | FeMo (62% Mo) | — | 3.75 |
| | FeSi (50% Si) | 2.00 | 11.25 |
| | Ni | 25.00 | — |
| | Mn | 2.00 | — |
| | Cr (86.5% Cr, 10.5% C) | — | 62.25 |
| | Graphite | — | 4.25 |
| | Fe Powder | 9.00 | 15.00 |
| | Total | 100.00 | 100.00 |
| | Fill (Percent) | 55% | 50% |
| | Density (g/cc) | 3.25 | 3.00 |
| Type of Deposit: | | Austenitic Stainless | Hard-Facing |

Whereas the particular embodiments of this invention have been described above for the purposes of illustration, it will be apparent to those skilled in the art that numerous variations of the details may be made without departing from the spirit of the invention.

I claim:

1. A method of making a generally rectangular continuous electrode, having a width to thickness ratio of at least 4:1, comprising the steps of:

forming sheet metal into a first continuous trough-shaped sheath, filling the trough-shaped sheath with granular electrode core materials, enclosing the sheath, intermittently mechanically depressing a portion of at least one electrode wall which defines the width of the electrode, inwardly toward and spaced apart from the opposing wall of the electrode along the length of the electrode to immobilizedly restrict the electrode core materials within the electrode, and then coiling the electrode.

2. A method as set forth in claim 1 wherein the trough-shaped sheath is generally rectangular.

3. A method as set forth in claim 1 wherein the trough-shaped sheet is generally circular.

4. A method as set forth in claim 3 wherein the generally circular trough-shaped sheath is flattened into a generally rectangular electrode after enclosing the filled sheath.

5. A method as set forth in claim 4 wherein intermittent mechanical depressions are provided simultaneously with flattening.

6. A method as set forth in cliam 1 wherein the sheath is enclosed by mechanically binding the edge portions of the trough with one another along the length of the electrode.

7. A method as set forth in claim 1 wherein the sheath is enclosed by placing a continuous strip of metal over the trough-shaped sheath and the edges of the strip are mechanically bound with the edge portion of the trough along the length of the electrode.

8. A method as set forth in claim 7 wherein the edges of the strip are crimped with the edges of the sheath.

9. A method as set forth in claim 7 wherein the edges of the strip are seamed with the edges of the sheath.

10. A method as set forth in claim 9 wherein the seam is subsequently compressed against the electrode.

11. A method as set forth in claim 7 wherein the trough-shaped sheath is enclosed with a strip having a cross-sectional width defining the approximate width of the electrode.

12. A method as set forth in claim 7 wherein the combined depth of the depressions formed in the sheath and in the strip define the approximate thickness of the electrode.

13. A method as set forth in claim 1 wherein the cross-sectional width to thickness ratio of the generally rectangular electrode is at least 6:1.

14. A method as set forth in claim 1 wherein the intermittent mechanical depression is provided by knurling.

15. A method as set forth in claim 1 wherein the size of any undepressed area at least on one side of the electrode which is provided with intermittent mechanical depressions, has at least one dimension which does not exceed 25% of the width of the electrode.

16. A method as set forth in claim 15 wherein the distance between knurl patterns is at least about one-sixteenth inch.

17. A method as set forth in claim 15 wherein the distance between knurl patterns is less than about one-half inch.

18. A generally rectangular, continuous electrode having a width to thickness ratio of at least 4:1 comprising:

a continuous trough-shaped, enclosed sheath of sheet metal, granular core materials immobilizedly disposed within the trough-shaped sheath, and intermittent mechanical depessions formed subsequently to the filling and the enclosing of the electrode in at least one wall of the electrode which defines the width of the electrode, along the length thereof, directed toward and spaced apart from the opposing wall of the electrode restricting the core materials into individual compartments with the electrode, the electrode being coiled.

19. An electrode as set forth in claim 18 wherein the edge portions of the sheath are crimped together along the length of the electrode.

20. An electrode as set forth in claim 18 wherein the edge portions of the sheath are seamed together along the length of the electrode.

21. An electrode as set forth in claim 18 wherein the edge portions of the sheath are welded together along the length of the electrode.

22. A generally rectangular, continuous electrode having a width to thickness ratio of at least 4:1 comprising:

a continuous trough-shaped sheath of sheet metal, granular core materials immobilizedly disposed within the trough-shaped sheath, a continuous strip of sheet metal closing the trough with the edges of strip, and intermittent mechanical depressions formed subsequently to the filling and the enclosing of the electrode in at least one wall of the electrode, which defines the width of the electrode, along the length thereof directed toward and spaced apart from the opposing wall of the electrode restricting the electrode core materials into individual compartments within the electrode, the electrode being coiled.

23. An electrode as set forth in claim 22 wherein the edges of the strip are crimped with the edges of the sheath.

24. An electrode as set forth in claim 22 wherein the edges of the strip are seamed with the edges of the sheath.

25. An electrode as set forth in claim 22 wherein the cross-sectional width to thickness ratio is at least 6:1.

26. An electrode as set forth in claim 22 wherein the strip has a cross-sectional width defining the approximate width of the electrode.

27. An electrode as set forth in claim 22 wherein the combined depth of the depressions formed in the sheath and in the strip define the approximate thickness of the electrode.

28. An electrode as set forth in claim 22 wherein the mechanical depressions comprise knurl patterns.

29. An electrode as set forth in claim 22 wherein the size of any undepressed area at least on one side of the electrode which is provided with intermittent mechanical depressions, has at least one dimension which does not exceed 25% of the width of the electrode.

30. An electrode as set forth in claim 22 wherein the distance between knurl patterns is at least about one-sixteenth inch.

31. An electrode as set forth in claim 22 wherein the distance between knurl patterns is less than about one-half inch.

* * * * *